Dec. 15, 1964  W. A. LAURIE  3,161,561
MODIFIED MELAMINE-TOLUENE SULFONAMIDE RESINS
Filed Sept. 26, 1958

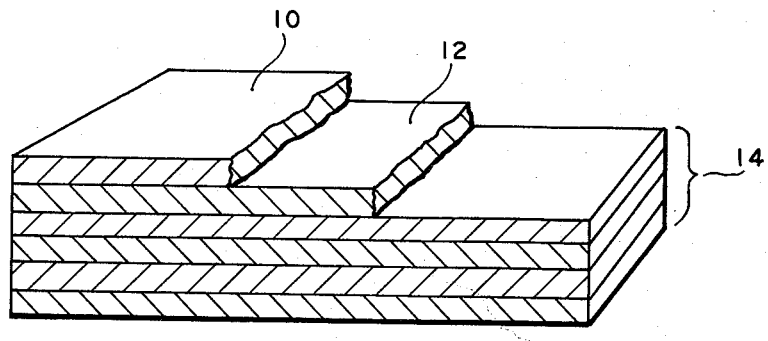

Fig. I

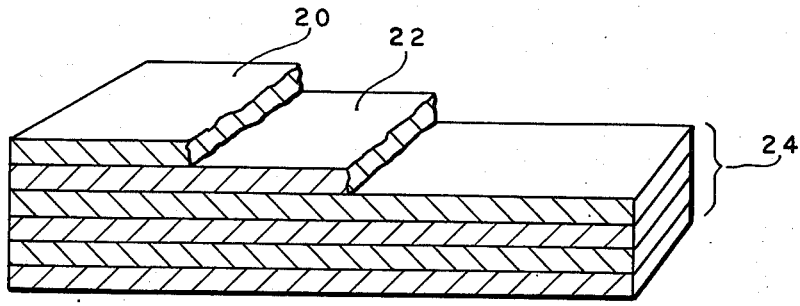

Fig. II

10 AND 20 – OVERLAY SHEETS IMPREGNATED WITH
  MELAMINE/FORMALDEHYDE/TOLUENE
  SULFONAMIDE/SUCROSE RESIN.
12 – PRINT SHEET IMPREGNATED WITH MELAMINE/
  FORMALDEHYDE/TOLUENE SULFONAMIDE/
  SUCROSE RESIN.
22 – PRINT SHEET IMPREGNATED WITH POST-
  FORMABLE MELAMINE RESIN.
14 AND 24 – PLURALITY CREPED PAPER SHEETS
  IMPREGNATED WITH POST-FORMABLE
  VARNISH.

WILLIAM A. LAURIE INVENTOR.

BY
ATTORNEY.

United States Patent Office 3,161,561
Patented Dec. 15, 1964

3,161,561
MODIFIED MELAMINE-TOLUENE
SULFONAMIDE RESINS
William A. Laurie, Somers, Conn., assignor to Monsanto
Company, a corporation of Delaware
Filed Sept. 26, 1958, Ser. No. 763,475
8 Claims. (Cl. 161—263)

The present invention relates to certain thermosetting resins and to laminated structures prepared therefrom.

Melamine-toluene sulfonamide-formaldehyde resins are widely employed in the preparation of laminated structures. In particular, such resins are used extensively to impregnate the print sheet of decorative laminates. While such resins have achieved substantial commercial success, they are subject to certain well-recognized shortcomings. First, the melamine-toluene sulfonamide-formaldehyde laminating resins have poor stability in aqueous solutions and tend to separate therefrom upon standing for relatively short periods of time, e.g., 1-2 days. The resin which separates from solution cannot be redispersed and must be discarded. As a result of this fact, the manufacturers of melamine-toluene sulfonamide-formaldehyde laminating resins must separate these resins from the aqueous solutions in which they are prepared by spray-drying or analogous drying processes. This drying step adds substantially to the cost of the resins. Second, freezing solutions of such resins irreversibly converts them into two phases. Third, the melamine-toluene sulfonamide-formaldehyde resins are more hydrophobic than unmodified melamine-formaldehyde resins and those resins which contain substantial quantities of toluene sulfonamide can only be dissolved in water-alcohol mixtures. It is also observed that because of their hydrophobic nature, the resins sometimes fail to thoroughly and uniformly impregnate the paper sheet. Fourth, the melamine-toluene sulfonamide-formaldehyde resins have relatively poor gloss and are seldom employed to impregnate the overlay sheet of decorative laminates. It would be desirable to have available to the art melamine-toluene sulfonamide-formaldehyde laminating resins which do not suffer from the above noted shortcomings.

It is an object of this invention to provide novel modified melamine-toluene sulfonamide-formaldehyde resins.

Another object of this invention is to provide aqueous solutions of modified melamine-toluene sulfonamide-formaldehyde resins which are stable over extended periods of time and which are not irreversibly converted into two phases by freezing.

A further object of this invention is to provide modified melamine-toluene sulfonamide-formaldehyde resins which are relatively hydrophilic and can be dissolved in either water or in water-alcohol mixtures containing small quantities of alcohol.

Yet another object of this invention is to provide modified melamine-toluene sulfonamide-formaldehyde resins which have good gloss.

A still further object of the invention is to provide decorative laminates in which the print sheet and/or the top or overlay sheet is paper impregnated with a modified melamine-toluene sulfonamide-formaldehyde resin.

Other objects and advantages of this invention will be apparent from the following detailed description thereof.

FIG. 1 is a schematic drawing of a post-formable laminate with overlay sheet 10 and print sheet 12 cut away. Both overlay sheet 10 and print sheet 12 are impregnated with the resin composition of this invention. Substrate 14 is a plurality of creped paper sheets impregnated with a post-formable varnish such as a cresol-formaldehyde resin.

FIG. II is a schematic drawing of a post-formable laminate with overlay sheet 20 and print sheet 22 cut away. Overlay sheet 20 is impregnated with the resin composition of this invention. Print sheet 22 is impregnated with a post-formable melamine resin such as melamine-toluene sulfonamide-formaldehyde resin. Substrate 24 is a plurality of creped paper sheets impregnated with a post-formable varnish such as a cresol-formaldehyde resin.

The present invention provides novel resins which are co-condensation products of a material of the group consisting of melamine and a mixture of 97.5 parts of melamine with up to 2.5 parts of thiourea, toluene sulfonamide, sucrose and formaldehyde in which the components are present in critical proportions and in which the resin is condensed to a critical degree as defined by the water-dilutability point. The resins of the invention are extremely stable in aqueous solutions and can be stored at 25° C. for periods of up to about 10-12 weeks without precipitation or gelation of the resin. Moreover, such resin solutions can be frozen and subsequently thawed without causing permanent separation of the resin from the solvent. The resins are quite hydrophilic and can be dissolved in either water or water-alcohol mixtures which contain only small quantities of alcohol. In addition, the resins have a high degree of gloss when cured.

The following examples are set forth to illustrate more clearly the principle and practice of this invention to those skilled in the art. Unless otherwise noted, where quantities are mentioned they are parts by weight.

EXAMPLE I

Part A

Two hundred parts (2.5 mols) of 37% formalin solution are neutralized to a pH of 8.9 with sodium hydroxide and there is then added to the solution 126 parts (1 mol) of melamine and 35 parts of sucrose. The reaction mixture is heated to 90° C. and held at this temperature for about 2 hours and until a drop of the resin solution forms a cloud or precipitate when dropped into 250 ml. of water at 25° C. At this point the reaction mixture is cooled to 65° C. and 20 parts of toluene sulfonamide are added thereto. The pH of the solution is adjusted to 8.2 and the reaction is allowed to proceed at 65° C. until the resin has a water-dilutability point of about 35%. The water-dilutability point is defined as the concentration of resin solids to which a resin solution can be diluted with water at 25° C. before incipient precipitation of the resin occurs. The resin solution is cooled to 25° C. and diluted with water to provide a solution of 60% resin solids. The 60% resin solution can be stored for 10-12 weeks at 25° C. without precipitation or gellation of the resin. The resin solution can be frozen and subsequently thawed without causing change of the solution properties.

Part B

To illustrate the outstanding solution stability of the resin prepared in Part A above, a control resin solution is prepared by dissolving 60 parts of a commercially available melamine-toluene sulfonamide-formaldehyde laminating resin in 40 parts of water. The control resin solution is maintained at 25° C. and a substantial quantity of the resin precipitates from the resin solution within 5-7 days. The prior art resin employed contains about 10% toluene sulfonamide and has a formaldehyde/melamine mol ratio of about 2.5/1.

EXAMPLE II

A resin is prepared in exactly the same manner as described in Example I, Part A, except that the quantity of sucrose employed is increased from 35 parts to 100 parts and the quantity of toluene sulfonamide employed is increased from 20 parts to 40 parts. A 60% solution of the resin in a solvent mixture consisting of 85% water and 15% ethyl alcohol can be stored for at least 30 days at 25° C. before precipitation or gellation of the resin is noted.

EXAMPLE III

Two hundred parts (2.5 mols) of 37% formalin solution and 35 parts of sucrose are heated to 65° C. for a period of 30 minutes to condense the formaldehyde with the sucrose. Thereafter, the pH is adjusted to 8.5 with sodium hydroxide and 126 parts (1 mol) of melamine are added to the solution. The reaction mixture is then heated to 90° C. for about 2 hours and until 1 drop of the resin solution forms a cloud or precipitate when dropped into 250 ml. of water at 0° C. At this point, the reaction mixture is cooled to 65° C. and 20 parts of toluene sulfonamide are added thereto. The pH of the reaction mixture is then adjusted to 8.2 and the reaction is continued at 65° C. until the resin has a water-dilutability point of about 25%.

EXAMPLE IV

A resin is prepared from a mixture of 126 parts (1 mol) of melamine, 200 parts (2.5 mols) of 37% formalin solution, 35 parts of sucrose, 20 parts of toluene sulfonamide and 1.0 part of thiourea following the procedure of Example I, Part A, with the thiourea being charged to the reaction with the toluene sulfonamide. The stability of the resin in aqueous solutions is comparable to the stability of the resin prepared in Example I, Part A.

EXAMPLE V

Three decorative laminates are prepared from 7 substrate sheets of kraft paper impregnated with about 35 weight percent of a commercially available phenol-formaldehyde resin, an alpha cellulose print sheet impregnated with about 40 weight percent of a melamine-formaldehyde resin and an alpha cellulose overlay sheet impregnated with about 65 weight percent of a melamine-formaldehyde resin. Throughout this application, the stated percentages of resin in a resin impregnated sheet are based on the weight of the final impregnated sheets. The laminates are prepared by pressing the assemblies for 20 minutes at 290° F. at a pressure of 1000 lbs./sq. in.

In laminate "A" both the print sheet and the overlay sheet are impregnated with the resin of this invention that is described in Example I, Part A. In laminate "B" the overlay sheet is impregnated with the resin of this invention described in Example I, Part A, and the print sheet is impregnated with a commercially available melamine-toluene sulfonamide-formaldehyde resin having a formaldehyde/melamine mol ratio of 2.5/1 and containing 10% toluene sulfonamide. In laminate "C" both the overlay sheet and print sheet are impregnated with a commercially available melamine-toluene sulfonamide-formaldehyde laminating resin having a formaldehyde/melamine mol ratio of 2.5/1 and containing 10% toluene sulfonamide.

The overlay sheets of laminates "A" and "B" are substantially more transparent than the overlay sheet of laminate "C." As a result, the print sheets of laminates "A" and "B" appear substantially clearer, brighter and better defined than the print sheet of laminate "C." In addition, the gloss of laminates "A" and "B" is much superior to the gloss of laminate "C."

Comparable results are obtained when the overlay sheets in laminates "A" and "B" are impregnated with the resin of Example II, III or IV. It is observed that the laminates in which the overlay sheet is impregnated with the resin of Example IV have even higher gloss than the laminates in which the overlay sheet is impregnated with the resin of Example I, II, or III.

EXAMPLE VI

A decorative laminate is prepared as described in the first paragraph of Example V and consists of 7 substrate sheets of kraft paper impregnated with about 35 weight percent of a commercially available phenol-formaldehyde resin, an alpha cellulose print sheet impregnated with about 40 weight percent of the resin described in Example I, Part A, and a viscous rayon paper overlay sheet impregnated with about 65 weight percent of a melamine-formaldehyde resin having a formaldehyde/melamine mol ratio of 2.5/1. The appearance of the laminate thus prepared is comparable to that of laminates "A" and "B" described in Example V.

EXAMPLE VII

Part A

A post-formable laminate is prepared from a post-formable core, a print sheet and an overlay sheet. The core consists of a bottom sheet of kraft paper, 3 intermediate sheets of crepe paper and a top sheet of kraft paper, all of said sheets being impregnated with about 35 weight percent of a commercially available post-formable, cresol-formaldehyde resin. The print sheet is a 12 mil sheet of alpha cellulose paper impregnated with 40 weight percent of the resin described in Example I, Part A. The overlay sheet is a 4 mil sheet of alpha cellulose paper impregnated with 65 weight percent of the resin described in Example I, Part A. The laminate is prepared by pressing the assembly for 20 minutes at 275° F. at a pressure of 1000 lbs./sq. in. The finished laminate is about 0.05 in. thick.

Parts B–D

Three laminates identical to that described in Part A above are prepared except that the print sheet and the overlay sheet are impregnated with, respectively, the resins described in Examples II, III, and IV.

Part E

A control prior art laminate is prepared in exactly the same manner as described in Part A above except that the resin employed to impregnate the print sheet and the overlay sheet is a commercially available melamine-formaldehyde laminating resin having a formaldehyde/melamine mol ratio of 2.5/1.

Part F

The post-formability of the laminates prepared in Parts A–E above is determined by NEMA method LP 2–2.11. In this test method, the laminates are heated and bent through an angle of 90° in a series of jigs providing varying radii of curvature at the bend. The smaller the radius of curvature through which the laminate can be bent without surface cracking, the better is the post-formability of the laminate. The laminates prepared in Parts A, B, C and D above with the resins of this invention can be bent through a ⅜ in. radius of curvature without cracking. By way of contrast, the laminate prepared in Part E above with a prior art melamine-formaldehyde laminating resin cracks when bent through a radius of curvature of 1 in.

The resins of this invention are characterized by both the ratio of the reactants contained therein and the degree of condensation. The resins contain (1) 5–25 and preferably 10–20 weight percent of toluene sulfonamide, (2) 10–35 and preferably 20–25 weight percent of sucrose and (3) the formaldehyde is present in the ratio of 2.0–4.0 and preferably 2.5–3.0 mols per mol of melamine. The toluene sulfonamide included in the resins may be either the ortho, meta or para isomer or any mixture thereof. The toluene sulfonamide employed in the previously described examples consists of an approximately 70/30 mixture of para/ortho isomers. The resins are condensed to the stage at which they have a water-dilutability point of 15–45 and preferably 25–35%. The water dilutability point is defined as the weight percent resin solids to which an aqueous resin solution can be diluted with water at 25° C. before incipient precipitation of the resin occurs. Alternatively, the water-dilutability point may be defined as the minimum weight percent of resin that must be mixed with water at 25° C. to form a homogeneous single phase solution.

Unless the limits discussed in the paragraph above are carefully observed, the resins either will be deficient in certain properties or will be relatively unstable in aqueous solutions or both. If the resins contain less than about 10 weight percent sucrose, little or no improvement in resin properties is attained. On the other hand, if the resins contain more than about 35 weight percent sucrose, the boiling water resistance of laminates prepared from such resins tends to be deficient. Optimum solution stability is attained when the resins contain 10–20 weight percent of sucrose and optimum post-formability is attained when the resins contain 20 or more weight percent of sucrose. An optimum balance of properties is attained when the resins contain about 20–25 weight percent of sucrose. Similarly, if the resins contain less than about 5% of toluene sulfonamide, the flow properties of the resins will be somewhat deficient and if the resins contain more than 25% toluene sulfonamide, the resins tend to be unduly hydrophobic.

The ratio of formaldehyde to melamine must be maintained within the range of 2.0–4.0 and preferably 2.5–3.0 mols per mol of melamine. If less than 2.0 mols of formaldehyde are employed per mol of melamine, the resins tend to be unstable in aqueous solution. If the formaldehyde is increased to greater than 4.0 mols per mol of melamine, laminates prepared therefrom tend to craze and/or blister and to be deficient in boiling water resistance.

If desired, thiourea may be employed in conjunction with the resins of the invention in amounts of up to about 2.5 weight percent of the melamine contained therein. The thiourea may be either co-condensed with the other reactants to become chemically bound therewith or may be admixed with a solution of the resin in water or a mixture of water and an acyclic alcohol containing 1–4 carbon atoms. The presence of this quantity of thiourea accelerates the cure rate of the resins and also increases the gloss of laminates prepared therefrom. In addition, the employment of thiourea with the resin permits decorative laminates having an overlay sheet impregnated therewith to be removed from the press hot without loss of gloss.

The water-dilutability point of the resins is particularly critical with respect to the stability of solutions of the resins in water. For reasons which are not clearly understood, if the water-dilutability point is below 15% or above 45%, the resins precipitate or gel from aqueous solutions in relatively short periods of time, e.g., 2–3 days.

When the resins of the invention are to be employed as laminating syrups, 40–60 weight percent of the resin should be dissolved in, correspondingly, 60–40 weight percent of a solvent consisting of either water or a mixture of a major amount of water and a minor amount of an acyclic alcohol containing 1–4 carbon atoms, e.g., methanol, ethanol, isopropanol, ethylene glycol, glycerine, propylene glycol, etc. The precise quantity of acyclic alcohol required in water-alcohol solvent media will depend somewhat upon the specific structure of the resin, but in general will be within the range of 5–20 weight percent. Laminating syrups of the above types can be stored for periods of 10–12 weeks at temperatures in the range of 20–30° C. with little or no precipitation of the resin from the solution.

The reaction between the melamine, the toluene sulfonamide, the sucrose and the formaldehyde should be carried out at a pH of 7–11 and preferably at a pH of 8–10. The pH of the reaction mixture is conveniently adjusted with an aqueous solution of an alkali such as sodium hydroxide or potassium hydroxide or an organic base such as triethanolamine, etc. The temperature of the reaction may be varied from about 60° C. to reflux temperature at atmospheric pressure. In general, it is preferred to first react the melamine, the sucrose and the formaldehyde and then add the toluene sulfonamide to the reaction mixture and continue the condensation until the desired water-dilutability point is reached. In one embodiment of the invention, the sucrose and formaldehyde can be first reacted in a neutral or slightly acidic (pH=5.0–6.5) aqueous medium. The pH is then adjusted to the alkaline side and the sucrose-formaldehyde reaction product is further reacted with the melamine until a single drop of the resin solution will form a cloud or precipitate when added to a large excess of water at 0–25° C. Thereafter, the toluene sulfonamide is added to the reaction mixture and the condensation is carried to the desired water-dilutability point.

The preparation of laminates employing the resins of the invention in general follows procedures which are known in the art. Inert filler sheets of alpha cellulose paper, viscose rayon paper, glass cloth or cloth prepared from cotton, wool or synthetic fibers are impregnated with 30–80 weight percent of the resin and dried to a volatile content of the order of 3–10%. An assembly of such resin-impregnated sheets is then subjected to a pressure of the order of 250–2000 lbs./sq. in. and heated for 10–60 minutes at a temperature of 200–350° F.

Decorative laminates are prepared from an assembly of (1) a rigid substrate, (2) a resin-impregnated print sheet, i.e., a paper sheet having a design printed thereon, and (3) a resin-impregnated top or overlay sheet. In such decorative laminates, the rigid substrate may consist of any suitable material such as plywood, a resin-bonded wood fiber board, or the like, a plurality of resin-impregnated sheets, etc. Either the print sheet or the overlay sheet or preferably both will be impregnated with a resin of this invention. An outstanding feature of the invention is the fact that the resins of the invention may be employed to impregnate the overlay sheet. Heretofore, the known melamine-toluene sulfonamide-formaldehyde resins containing substantial quantities of toluene sulfonamide had insufficient gloss to be employed in impregnating the overlay sheet. Although the overlay sheet impregnated with the resins of this invention may be a viscose rayon paper, a further outstanding feature of the invention is that excellent transparency is obtained even when the overlay sheet is a high alpha cellulose paper. This is a matter of considerable importance, since the viscose rayon papers presently employed in the overlay sheet are considerably more expensive than the high alpha cellulose papers which are employed in the print sheet. High alpha cellulose papers are defined as those in which the fibrous web consists of at least about 90 weight percent of alpha cellulose.

Where decorative laminates having post-forming properties are desired, the rigid substrate must be of a post-formable material such as a plurality of paper sheets (preferably creped) impregnated with specially formulated post-formable varnishes such as cresol-formaldehyde resins, cresol-phenol-formaldehyde resins, etc. The print sheet and the overlay sheet must be impregnated with either a resin of the present invention or another post-formable melamine resin such as a melamine-toluene sulfonamide-formaldehyde resin (only suitable for impregnating the print sheet), a melamine-omega cyanoalkyl-guanamine-formaldehyde resin (suitable for impregnating either the print sheet or the overlay sheet) or a melamine-sucrose-formaldehyde resin of the type described in my copending application filed of even date herewith (also suitable for impregnating either the print sheet or the overlay sheet). It is understood of course, that either the print sheet or the overlay sheet or preferably both are impregnated with a resin of this invention.

The above descriptions and particularly the examples are set forth for purposes of illustration only. Many other variations and modifications thereof will be apparent to those skilled in the art and can be made without departing from the spirit and scope of the invention herein described.

What is claimed is:

1. A resinous co-condensation product of (1) a material of the group consisting of melamine and a mixture of 97.5 parts of melamine with up to about 2.5 parts of thiourea, (2) toluene sulfonamide (3) sucrose and (4) formaldehyde having a water-dilutability point of 15–45%; said toluene sulfonamide constituting 5–25 weight percent of the resin; said sucrose constituting 10–35 weight percent of the resin; and said formaldehyde being present in the ratio of 2.0–4.0 mols per mol of melamine.

2. A resinous co-condensation product of (1) a material of the group consisting of melamine and a mixture of 97.5 parts of melamine with up to about 2.5 parts of thiourea, (2) toluene sulfonamide, (3) sucrose and (4) formaldehyde having a water-dilutability point of 25–35%; said toluene sulfonamide constituting 10–20 weight percent of the resin; and sucrose constituting 20–25 weight percent of the resin; said formaldehyde being present in the ratio of 2.5–3.0 mols per mol of melamine.

3. A laminating syrup that is stable for an extended period of time and comprising 40–60 weight percent of a resin of claim 1 in solution of 60–40 weight percent of a solvent taken from the group consisting of water and mixtures of a major amount of water and a minor amount of an acyclic alcohol containing 1–4 carbon atoms.

4. A laminating syrup that is stable for an extended period of time and comprising 40–60 weight percent of a resin of claim 2 in solution of 60–40 weight percent of a solvent taken from the group consisting of water and mixtures of a major amount of water and a minor amount of an acyclic alcohol containing 1–4 carbon atoms.

5. The method for preparing a resin which comprises co-condensing (1) a material of the group consisting of melamine and a mixture of 97.5 parts of melamine with up to about 2.5 parts of thiourea, (2) toluene sulfonamide, (3) sucrose and (4) formaldehyde in an alkaline aqueous solution to a water-dilutability point of 15–45%; said toluene sulfonamide constituting 5–25 weight percent of the reactants; said sucrose constituting 10–35 weight percent of the reactants; said formaldehyde being present in the ratio of 2.0–4.0 mols per mol of melamine.

6. The method for preparing a resin which comprises co-condensing (1) a material of the group consisting of melamine and a mixture of 97.5 parts of melamine with up to about 2.5 parts of thiourea, (2) toluene sulfonamide, (3) sucrose and (4) formaldehyde in an alkaline aqueous solution to a water-dilutability point of 25–35%; said toluene sulfonamide constituting 10–20 weight percent of the reactants; said sucrose constituting 20–25 weight percent of the reactants; said formaldehyde being present in the ratio of 2.5–3.0 mols per mol of melamine.

7. A normally rigid post-formable laminate comprising a sheeted inert filler bonded with a thermoset resin of claim 1.

8. A normally rigid post-formable laminate comprising a sheet inert filler bonded with a thermoset resin of claim 2.

References Cited by the Examiner
UNITED STATES PATENTS

| | | | |
|---|---|---|---|
| 2,197,357 | 4/40 | Widmer et al. | |
| 2,508,875 | 5/50 | Scott | 260—67.6 |
| 2,740,737 | 7/54 | Elmer et al. | 154—138 |
| 2,908,603 | 10/59 | Scott. | |

FOREIGN PATENTS 507,175  6/39  Great Britain.

OTHER REFERENCES

Hodgins et al.: "Melamine-Formaldehyde Film-Forming Compositions," Industrial and Engineering Chemistry, June 1941, vol. 33, No. 6, pages 769–771.

The Chemistry of Synthetic Resins, by Carleton Ellis, vol. I, page 638, Reinhold Publishing Corp., 1935, New York, N.Y.

The Chemistry of Commercial Plastics, by R. L. Wakeman, Reinhold Publishing Corp., page 203, New York, N.Y., 1947.

EARL M. BERGERT, *Primary Examiner.*

ALEXANDER WYMAN, CARL F. KRAFFT, DANIEL ARNOLD, *Examiners.*